(12) United States Patent
Okamura et al.

(10) Patent No.: US 8,400,889 B2
(45) Date of Patent: Mar. 19, 2013

(54) OPTICAL PICKUP DEVICE HAVING DISC PROTECTOR

(75) Inventors: Masayuki Okamura, Fujisawa (JP);
Akiko Mizushima, Yokohama (JP);
Hidenao Saito, Yokohama (JP); Jun Hato, Fujisawa (JP); Kazumi Takahashi, Toyokawa (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 111 days.

(21) Appl. No.: 12/765,464

(22) Filed: Apr. 22, 2010

(65) Prior Publication Data
US 2010/0322061 A1    Dec. 23, 2010

(30) Foreign Application Priority Data

Jun. 22, 2009  (JP) .................................. 2009-147184

(51) Int. Cl.
*G11B 7/00* (2006.01)
(52) U.S. Cl. .................................................. 369/44.14
(58) Field of Classification Search .................. None
See application file for complete search history.

(56) References Cited

U.S. PATENT DOCUMENTS

| | | | | | |
|---|---|---|---|---|---|
| 4,818,069 | A * | 4/1989 | Maan | ......................... | 369/44.14 |
| 5,083,302 | A * | 1/1992 | Tsuyuguchi et al. | ...... | 369/44.11 |
| 6,327,241 | B1 * | 12/2001 | Boutaghou et al. | ........... | 369/300 |
| 6,404,723 | B1 * | 6/2002 | Morishita | ................ | 369/112.23 |
| 6,489,013 | B2 * | 12/2002 | Nagai et al. | .................... | 428/209 |
| 7,123,424 | B2 * | 10/2006 | Sekine | .......................... | 359/719 |
| 7,286,448 | B2 * | 10/2007 | Suzuki et al. | ............... | 369/44.14 |
| 7,535,663 | B2 * | 5/2009 | Choi et al. | ..................... | 359/824 |
| 7,873,970 | B2 * | 1/2011 | Arai et al. | ....................... | 720/671 |
| 2002/0097639 | A1 * | 7/2002 | Ishizaki et al. | ............. | 369/13.13 |
| 2006/0132937 | A1 * | 6/2006 | Choi et al. | ..................... | 359/824 |
| 2006/0209639 | A1 | 9/2006 | Bammert et al. | | |
| 2007/0280058 | A1 * | 12/2007 | Kawasaki et al. | .......... | 369/44.14 |
| 2008/0052734 | A1 * | 2/2008 | Arai et al. | ...................... | 720/681 |
| 2008/0056101 | A1 * | 3/2008 | Hatano | ..................... | 369/112.24 |
| 2008/0123198 | A1 * | 5/2008 | Fujita | ............................. | 359/709 |
| 2009/0147659 | A1 | 6/2009 | Komma et al. | | |
| 2010/0067351 | A1 | 3/2010 | Yabe et al. | | |
| 2010/0271924 | A1 * | 10/2010 | Yukimasa et al. | ........ | 369/112.01 |
| 2010/0278302 | A1 | 11/2010 | Yokoyama et al. | | |
| 2010/0322061 | A1 * | 12/2010 | Okamura et al. | ........ | 369/112.23 |

FOREIGN PATENT DOCUMENTS

| | | |
|---|---|---|
| CN | 1831969 | 9/2006 |
| CN | 101243501 | 8/2008 |
| JP | 11-016196 | 1/1999 |
| JP | 2005-085291 | 3/2005 |
| JP | 2006-099814 A | 4/2006 |
| JP | 2006-260761 | 9/2006 |
| JP | 2007-277419 | 10/2007 |
| JP | 2008-052812 | 3/2008 |
| JP | 2008-052812 A | 3/2008 |
| JP | 2008-269733 A | 11/2008 |
| WO | WO 2008-065783 a1 | 5/2008 |

* cited by examiner

*Primary Examiner* — Peter Vincent Agustin
(74) *Attorney, Agent, or Firm* — Foley & Lardner LLP

(57) ABSTRACT

There is provided a low-cost and reliable optical pickup device, wherein an objective lens is in contact with an adhesive at least one or more portions and fixed to the adhesive and also the height of the adhesive for fixing the objective lens is higher than the surface of the objective lens or the end of the objective lens, thereby a sufficient adhesive strength is secured between the objective lens and a member to which the objective lens is adhered and further this adhesive serves also as a disc protector.

3 Claims, 9 Drawing Sheets

OPTICAL PICKUP DEVICE HAVING DISC PROTECTOR

INCORPORATION BY REFERENCE

The present application claims priority from Japanese application JP-A-2009-147184 filed on Jun. 22, 2009, the content of which is hereby incorporated by reference into this application.

BACKGROUND OF THE INVENTION

The present invention relates to optical pickup devices used in recording/reproducing in an optical recording media, such as a CD (compact disc), a DVD (digital versatile disc), or a Blu-ray disc (registered trademark).

The optical pickup device used in the recording/reproducing in the optical recording media, such as the CD or DVD, or an optical disc drive having the optical pickup device incorporated therein comprises: a first optical system which introduces emitted light from a light emitting element, such as a laser diode, to an objective lens through various kinds of lenses, a prism, a mirror, and the like, and focuses the emitted light on the optical recording medium; and a second optical system which receives returned light from the optical recording medium by means of a photoelectric conversion element for converting an optical output into an electric signal through the objective lens, other various kinds of lenses, the prism, and the mirror. Among them, the optical components, such as various kinds of lenses, need to be fixed to optimum positions with respect to a case of the optical pickup from the optical viewpoint, by using an adhesive.

For an optical disc medium of various standards or an optical disc causing surface blurring due to warping of the disc, the above-described optical pickup device causes an actuator to finely adjust the height of an objective lens and keep a certain distance (a working distance, hereinafter abbreviated as WD) between the objective lens and the optical disc surface, thereby enabling the stable reading or writing of a signal of the optical disc.

Until now, an optical pickup device which is not a thin shape but the so-called "half-height type" among the optical pickup devices does not need a protector member for protecting the disc, being provided so as to be higher than the objective lens in the vicinity of the objective lens of the optical pickup device, because a design to secure a sufficient distance between the optical disc surface and the objective lens surface is possible.

However, the distance between the optical disc surface and the objective lens surface has been decreasing with a reduction in the thickness of a personal computer or the like, and therefore when a focus servo for an actuator deviates or when an external impact force is applied to the optical disc device, the objective lens or the reading surface of the optical disc is damaged and thus a signal cannot be read. Therefore, a low-profile optical pickup device usually employs a structure, in which a protection (protector) member is attached at a position which is protruding toward an optical disc surface side further than the objective lens.

In recent years, an optical pickup device for a Blu-ray disc corresponding to a blue semiconductor laser, or the optical disc drive having the optical pickup device incorporated therein has become conspicuous. In these devices, since the distance between the optical disc and the objective lens decreases further than that in the CD, DVD, or the like, a protector member preventing the objective lens from colliding with the disc and damaging the disc has been required in all of the low-profile, very low-profile, and half-height type optical pickup devices.

As such a protect member, a special POM (polyoxymethylene) or a special fluorine-based molding resin is used which has such an excellent sliding characteristic that will not damage the optical disc surface even if coming into contact with the optical disc surface. These members are characterized in that when coming into contact with the rotating optical disc, the resin thereof itself is easily ground without damaging the optical disc surface, and further that even when an external impact force is applied, these members will not damage the optical disc surface because the contact surface is slippery. Moreover, the objective lens holder is made usually using a liquid crystal polymer or the like from the view point of precision moldability.

Note that, with regard to the optical pickup device, the following patent documents are listed as the prior art documents. JP-A-2006-99814 describes an optical pickup device, wherein a resin capable of serving as a disc protector is fixed around the objective lens and a buffer coating film is applied to the head top of the resin.

JP-A-2008-52812 describes an optical pickup device having a bonded structure in which two types of adhesives are used, one of which is used for the disc protector and the other one is used for preventing the disc protector from peeling off, and further the height of the adhesive for the disc protector is set higher than that of the peeling-off preventive adhesive.

JP-A-2008-269733 describes an optical pickup device, wherein a step is provided at the end of an objective lens, and the objective lens is adhered and fixed to an objective lens holder by applying an adhesive between the objective lens and the objective lens holder.

SUMMARY OF THE INVENTION

In the above-described prior arts, although the performance as the optical pickup device is satisfactory, there are problems that the assembly workability is very poor and the number of process steps will increase. Moreover, there are problems of increasing cost and the like because the protect member should be made using a special resin.

In the prior art shown in JP-A-2006-99814, when the disc protector is formed with the adhesive, a protrusion formed of the adhesive has a tack property, a large friction coefficient, and a poor sliding characteristic as compared with the above-described resins, such as the POM or the fluorine-based special resin having small friction coefficients and extremely excellent sliding characteristics. Generally, an adhesive having a small friction coefficient is known to have a high surface hardness and a small tack property. Then, when attempting to cause the adhesive to slide on the optical disc surface with only one type of adhesive, an adhesive which is hard and has a small tack property needs to be selected in order to reduce the friction coefficient. However, even in this case, because the friction coefficient thereof cannot be reduced to an extent comparable to that of the resin such as the special resin shown above having a small friction coefficient and an extremely excellent sliding characteristic. Also, since it is hard, there is a problem of damaging the optical disc. As its countermeasure there is a method of reducing the hardness of the adhesive, however, with an increase in the tack property, the friction coefficient of the adhesive increases and the frictional force applied to the adhering portion increases further. On the other hand, because the hardness is low, upon application of an impulse force this resin collides with the lens holder or objective lens and consequently causes a damage. For this reason, one type of adhesive could not satisfy both the sliding characteristic and the countermeasure against collision unlike the molding resin shown above.

In JP-A-2008-52812, two types of adhesives are used, one of which is used as a disc protector and the other one is used so as not allow the disc protector to move even if it collides with the optical disc. However, in this method, two types of adhesives should be applied to a very narrow place, which is disadvantageous in terms of increasing cost and complicated work.

In JP-A-2008-269733, the structure for fixing the objective lens is referred to but the disc protector is not described.

In order to solve the above-described problems, it is an object of the present invention to provide a low-cost and reliable optical pickup device and an optical disc drive including this optical pickup device, by realizing a function equivalent or superior to the original disc protector only by means of an adhesive and furthermore improving the assembly workability.

According to an aspect of the present invention, in order to achieve the above-described object, an optical pickup device recording information to an optical disc or reading information recorded in the optical disc comprises: a light source emitting a laser beam; an objective lens for collecting the laser beam onto an optical disc; a lens fixing portion fixing the objective lens; and a light receiving element receiving through the objective lens a laser beam reflected at an information recording layer in the optical disc, wherein the objective lens is fixed to the lens fixing portion using an adhesive, and wherein the height of the adhesive relative to the lens fixing portion is higher than the height of a surface of the objective lens or an upper end of the objective lens.

According to the present invention, a disc protector (contact preventive device) for preventing the occurrence of a damage to the objective lens or the optical disc when a focus servo for an actuator portion deviates and when an impact load is applied, can be formed easily and at low cost. Furthermore, the disc protector can be used also as an adhesive for the objective lens at the same time, so that it is possible to greatly contribute to a reduction in the cost of the optical pickup device.

Other objects, features and advantages of the invention will become apparent from the following description of the embodiments of the invention taken in conjunction with the accompanying drawings.

DETAILED DESCRIPTION OF THE EMBODIMENTS

Embodiments of optical pickup devices according to the present invention will be described with reference to the accompanying drawings.

First Embodiment

Figure 13:
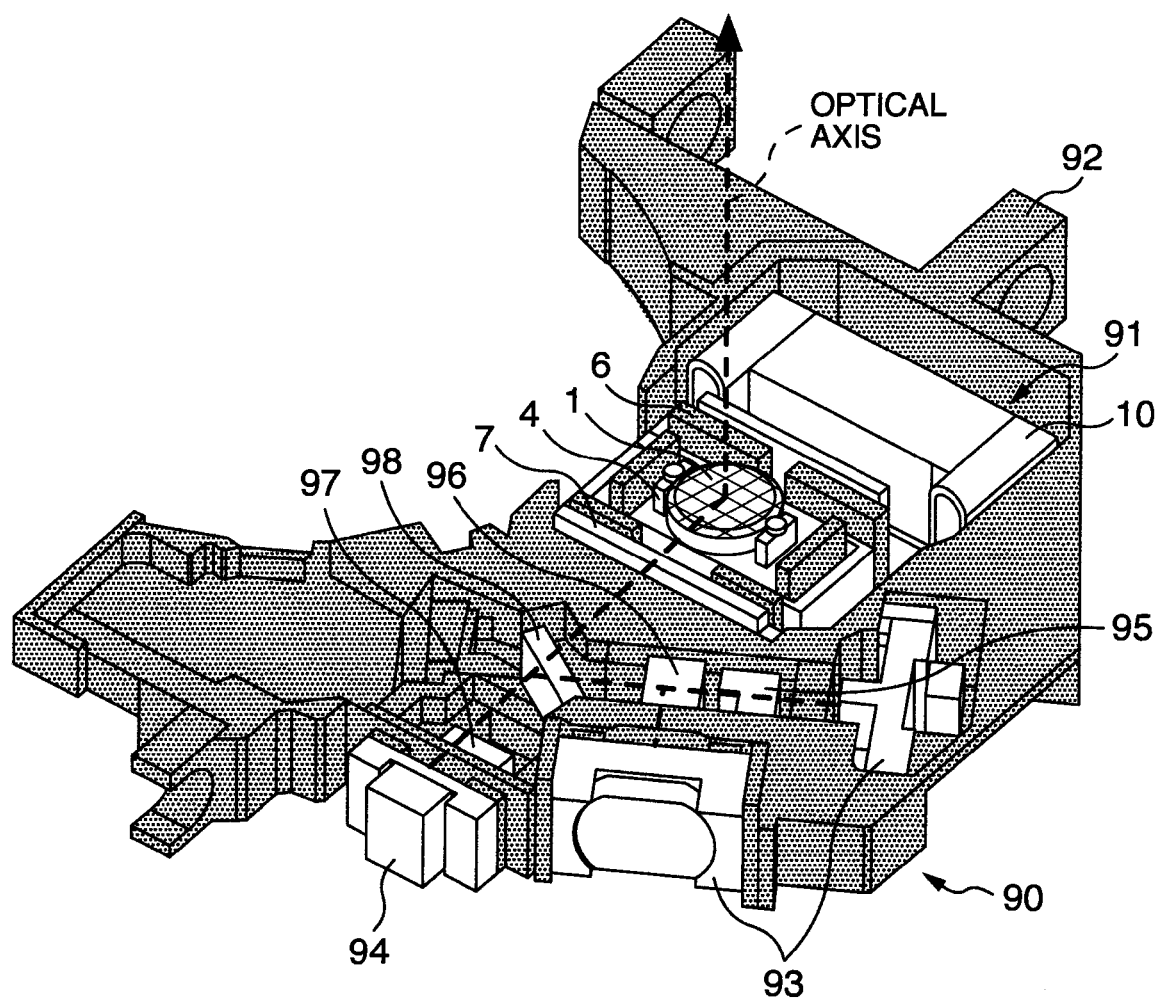
FIG. 13 is a perspective view illustrating one embodiment of the optical pickup device according to the present invention.

An optical pickup device 90 according to this embodiment is a device which irradiates an optical disc (not shown) with a laser beam and receives reflected light, thereby reading data from the optical disc or writing data to the optical disc, as illustrated in FIG. 13. The optical pickup device 90 comprises: an objective lens 1 for allowing a laser beam to pass therethrough to an optical disc so as to focus with a predetermined spot diameter and receiving the reflected light; an actuator portion 91 having the objective lens 1 provided therein and driving the objective lens 1 in a tracking direction and in a focusing direction; an optical system including a plurality of optical elements (an auxiliary lens 95, a prism 96, a detection lens 97, a beam splitter 98, and the like); a pickup base (housing) 92 provided with these components therein and being movable in a radial direction of the optical disc; first and second laser diodes 93; and a photodiode 94 receiving the reflected light from the optical disc. In the region from the laser diode 93, from which a laser beam is emitted, to the objective lens 1 which the laser beam reaches, and in the region from the objective lens 1, which the reflected light from the optical disc enters, to the photodiode 94 which the reflected light reaches, there are arranged the plurality of optical elements (the attachment lens 95, the prism 96, the detection lens 97, the beam splitter 98, and the like).

Figure 1:
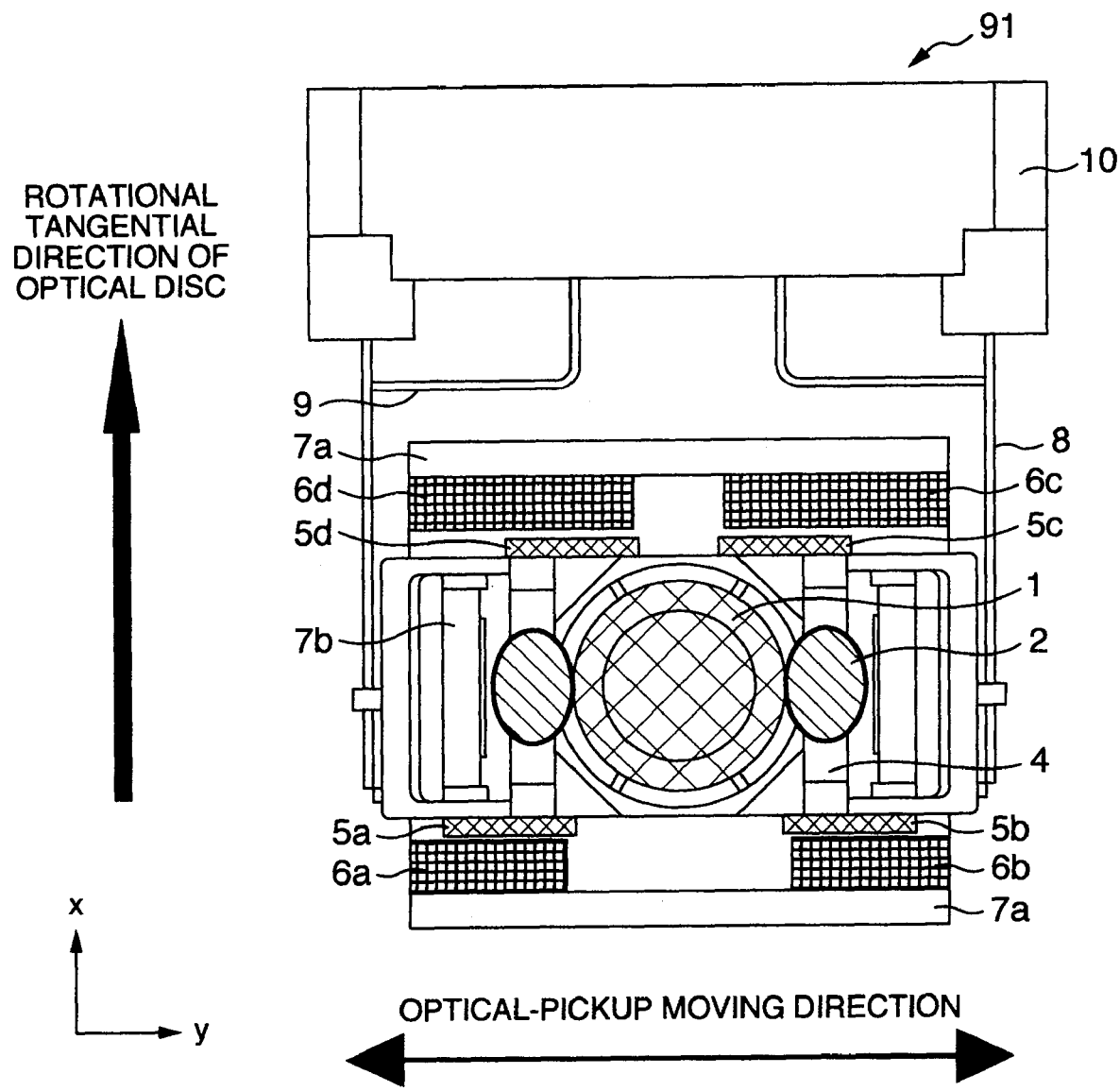
FIG. 1 is a top view illustrating an embodiment of an actuator portion in an optical pickup device according to the present invention.
Figure 2:
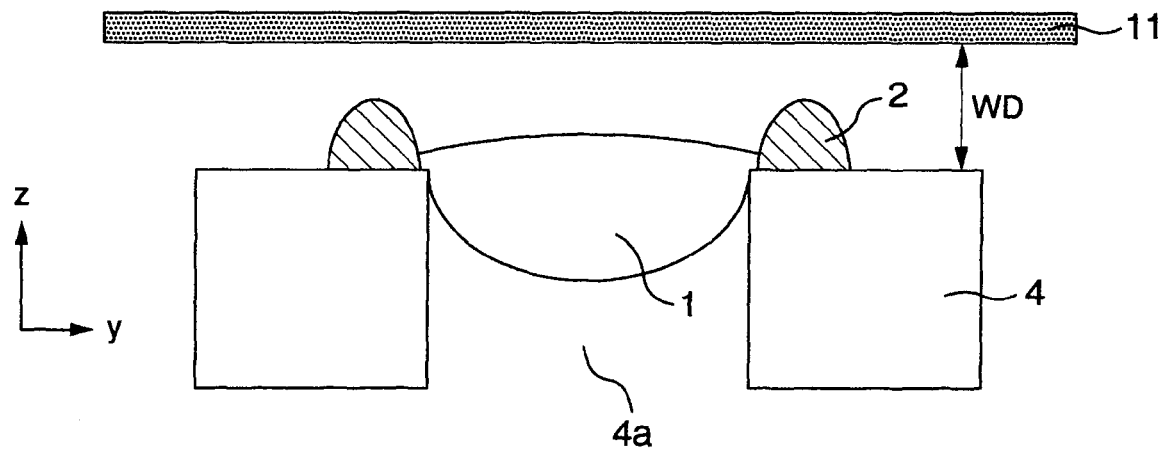
FIG. 2 is a cross sectional view illustrating a first embodiment in the optical pickup device according to the present invention.

The actuator portion (comprising a movable part adjusting the objective lens in the three-dimensional directions and an objective lens driver) 91 is configured as illustrated in FIG. 1 and FIG. 2. In FIG. 1 and FIG. 2, the x-axis direction represents the rotational tangential direction of the optical disc 11, the y-axis direction represents the moving direction of the optical pickup device 90 (the tracking direction which is the radial direction of the optical disc 11), and the z-axis direction represents the focusing direction which is the optical axis direction of the objective lens 1. The actuator portion 91 of the optical pickup device according to the present invention comprises the objective lens 1, a lens holder 4, an AF coil (not shown), TR coils 5a-5d, magnets 6a-6d, yoke plates 7a, 7b, a suspension wire 8, a T wire 9, and a damping holder 10. The lens holder 4 holding the objective lens 1 is made using a liquid crystal polymer or the like from the view point of precision moldability. Then, the focusing coil (AF coil) which is a drive coil is wound around the lens holder 4, and four tracking coils (TR coil) 5a-5d are attached thereto. The lens holder 4 is attached to the damping holder 10 via the electrically conductive wire-like supporting member (the suspension wire 8, the T wire 9). Here, the movable portion comprises the objective lens 1, the lens holder 4 holding the objective lens 1, the AF coil provided in the lens holder 4, and the four TR coils 5a-5d attached to the lens holder 4. The permanent magnets (magnets) 6a-6d whose magnetization direction is the x-axis direction in the drawing are attached and fixed to the outer yoke 7a, which is the yoke member comprising a magnetic material, on both sides of the movable portion parallel to the tracking direction. From the bottom surface of the outer yoke 7a, the inner yoke 7b similarly comprising a magnetic material is arranged so as to be positioned inside the AF coil. This forms a magnetic circuit through which the magnetic fluxes from the permanent magnets 6a-6d pass to the inner yoke 7b and the outer yoke 7a. Here, on one side of the movable portion parallel to the tracking direction of the y-axis in the drawing, the permanent magnet 6a and the permanent magnet 6b are arranged apart from each other on both end sides of the movable portion, and also on the other side of the movable portion parallel to the tracking direction, the permanent magnet 6c and the permanent magnet 6d are arranged apart from each other toward the center of the movable portion. In this way, each of the permanent magnets 6a, 6b is arranged so as to face each of the tracking coils 5a, 5b which are arranged apart from each other on both end sides of the movable portion, and each of the permanent magnets 6c, 6d is arranged so as to face each of the tracking coils 5c, 5d which are arranged apart from each other toward the center of the movable portion.

In this way, with regard to the polarity of the respective permanent magnets 6a-6d, if a side close to the focusing coil is set to the N pole and the outer yoke 7a side is set to the S pole and current is fed into the AF coil coupled to a printed circuit board which is electrically coupled to the T wire 9 using a solder, then a force in the z direction is generated in the AF coil to drive the movable portion in the z direction which is the focusing direction. Furthermore, if current is fed into the TR coils 5a-5d coupled to the printed circuit board which is electrically coupled to the suspension wire 8 using a solder, then a force in the y direction is generated in the TR coils 5a-5d to drive the movable portion in the y direction which is the tracking direction.

Note that the present invention is not limited to the actuator portion of the optical pickup device described above.

Next, the configuration of the actuator portion 91 of the optical pickup device 90 according to the present invention is described.

In addition to the above-described configuration, as the countermeasure of preventing the objective lens 1 or the objective lens holder 4 from coming into contact with the rotating optical disc 11, a member (contact preventing member) corresponding to the disc protector, which is provided on the upper surface of the objective lens holder 4 formed from a liquid crystal polymer and the like, is formed from an adhesive, and this adhesive is formed on the optical disc 11 side so that the height thereof becomes lower than the WD, and furthermore the above-described adhesive is in contact with the objective lens 1 at least at one or more places to adhere and fix the objective lens 1 to the objective lens holder 4. Since a WD of the objective lens for a CD or DVD is 0.3 mm and a WD of the objective lens for a Blu-ray is 0.1 mm, the height of the adhesive is preferably equal to or less than 0.3 mm for the CD or DVD and 0.1 mm for the Blu-ray. Here, the direction of the height refers to the direction from the objective lens 2 or the lens holder 4 toward the optical disc, and substantially agrees with the optical axis direction of the objective lens. Moreover, since the raw material of the optical disc is polycarbonate, it is necessary to use an adhesive having a modulus of elasticity sufficiently smaller than that (2 GPa) of polycarbonate. Accordingly, with regard to the adhesive used in the present invention, such a soft adhesive whose modulus of elasticity is equal to or less than 1 GPa is preferably used. With the use of such soft adhesive, even when the adhesive collides with the optical disc 11, the impulse at this instance is absorbed and thus the objective lens 1, the objective lens holder 4, and the optical disc 11 will not be damaged.

If there are at least two or more adhering portions on both sides of the objective lens 1, the adhesive strength and the performance as the disc protector is not spoiled.

Note that, the actuator portion 91 is fixed via a bonding material, such as an adhesive, to an optical pickup case (housing) 92 formed by die-casting or molding containing either of Zn, Mg, Al, or PPS (Poly Phenylene Sulfide) as a principal component.

As the adhesive as the member corresponding to the disc protector for preventing contact with the rotating optical disc 11 in the actuator portion 91 of the optical pickup device 90 according to the present invention, an adhesive whose modulus of elasticity is equal to or greater than 1 GPa is preferable. Moreover, since precise coating for controlling the height is required, it is preferable to use such an adhesive that will not sag immediately after coating. For this reason, a UV-curable adhesive (acrylic-based one or an epoxy-based one) or a silicone-based adhesive capable of curing in a short time is preferable. If this adhesive contains a hard filler such as $SiO_2$, $Al_2O_3$, or MgO, then the disc side may be damaged when the adhesive collides with the optical disc 11.

Then, it is preferable to use an adhesive containing such a filler of minute size (nano filler) in the range from 100 nm to 500 nm along one side. Moreover, if the shape of the nano filler is tabular, the optical disc is unlikely to be damaged as compared with in the case of a spherical or granular type filler. Accordingly, with regard to the nano filler, the tabular nano filler produced from clay that is abundant also in the natural world is advantageous also in terms of cost.

Figure 11:
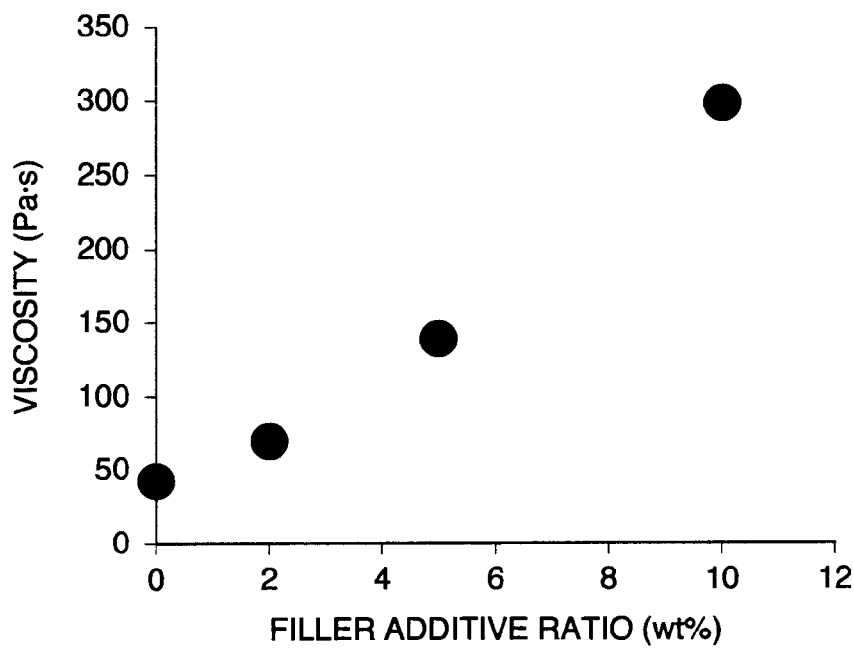
FIG. 11 represents a result of the viscosity measurement of an adhesive used in the first to fourth embodiments according to the present invention.
Figure 12:
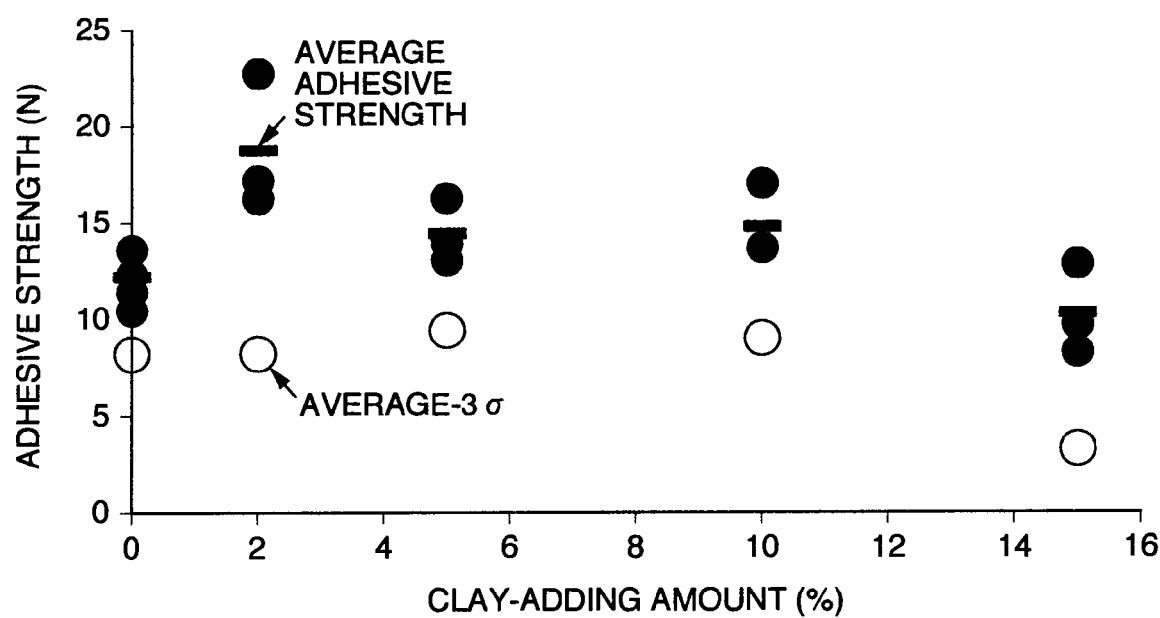
FIG. 12 represents a result of the adhesive strength measurement of the adhesive used in the first to fourth embodiments according to the present invention.

The amount of the nano filler added can be determined from FIG. 11 and FIG. 12. FIG. 11 represents the viscosity of an adhesive to which the nano filler is added, and FIG. 12 represents the evaluation of the adhesive strength when the adhesive to which the nano filler is added is used. The viscosity in FIG. 11 was measured using a cone-plate viscometer at a measurement temperature of 25° C. The measurement was conducted at a rotational speed of 2 rpm. As the amount of the nano filler added increases, the viscosity increases so that the handling property would be degraded from the viewpoint of workability. Therefore, at this time, it may be undesirable to add a 10 wt % or more of nano filler.

With regard to these problems, with the use of an adhesive whose viscosity before adding the nano filler is low, the problems associated with the performance of a dispenser for applying the adhesive and the workability at the time of applying the adhesive may be improved, and a further increase in the additive amount may be possible.

Moreover, as apparent from FIG. 12, the adhesive strength decreases when the amount of the nano filler added is equal to or greater than 10 wt %. The adhesive strength decreases because the amount of the adhesive component for use in adhering to the adherend decreases due to an increase in the amount of the nano filler added.

As described above, an adhesive containing 10 wt % or less of such nano filler whose size is in the range from 100 nm to 500 nm along one side is preferable.

Moreover, use of a nano filler whose surface is covered with organic molecules facilitates the nano filler to disperse into the adhesive. As the dispersion method, a triple roll mill or a kneader is preferably used.

Since the thermosetting adhesive is applied and thereafter cured by heating, the viscosity decreases with an increase in temperature. Therefore, an optimal alignment of the thermosetting adhesive is difficult. However, by adding the nano filler to the thermosetting adhesive, the viscosity increases and the viscosity decrease due to the increase in temperature is hard to occur, thus enabling the use of the thermosetting adhesive.

Note that, as the configuration characteristic to the present invention, the configuration described above is most preferable, but is not necessarily limited thereto.

Figure 3:
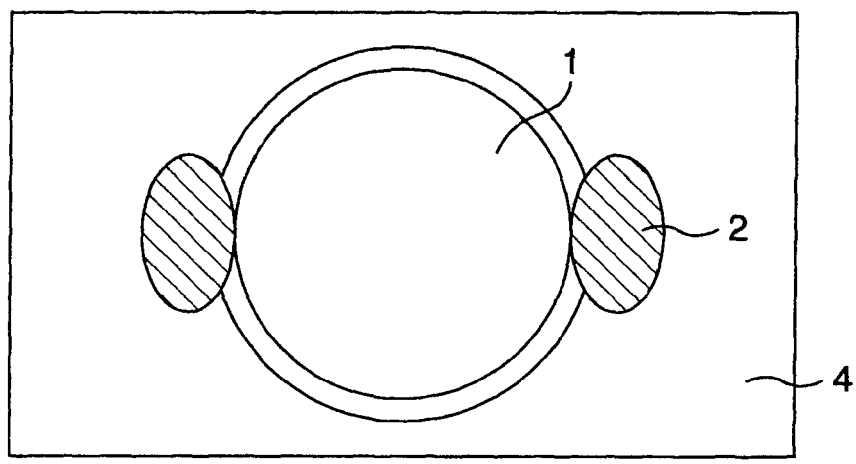
FIG. 3 is a top view illustrating the first embodiment in the optical pickup device according to the present invention.
Figure 4:
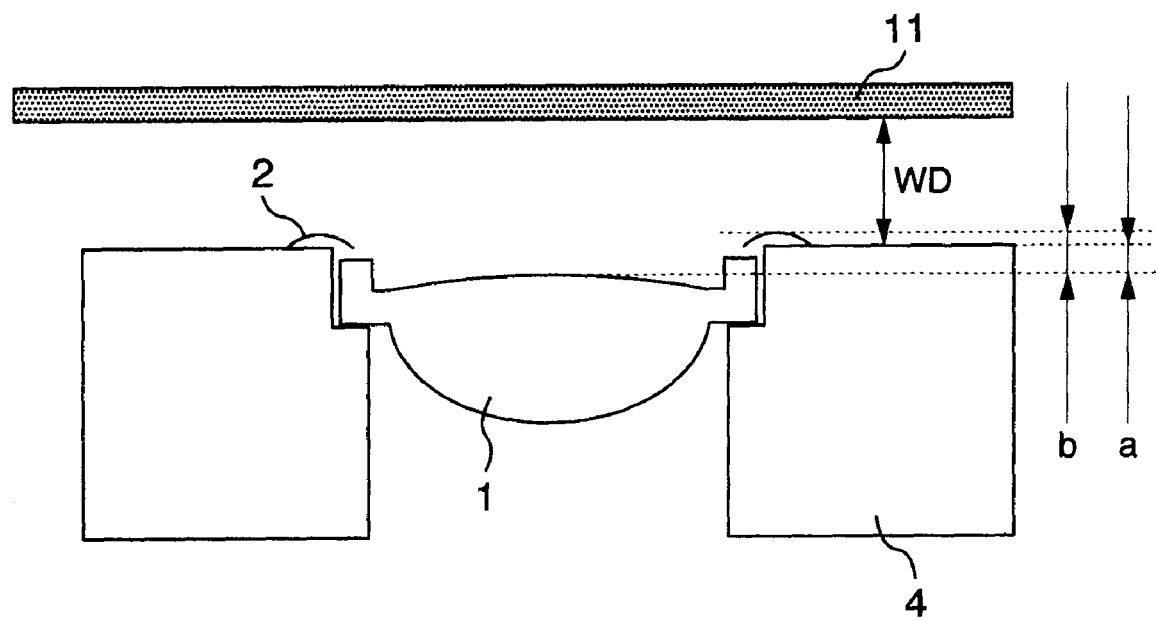
FIG. 4 is a cross sectional view illustrating the first embodiment in the optical pickup device according to the present invention.

FIG. 2 and FIG. 4 are the side views of actuator portions of a first embodiment according to the present invention, and FIG. 3 is the top view. The objective lens 1 has a through-hole 4a through which a laser beam passes, and on the through-hole 4a or inside the through-hole 4a, the objective lens holder 4 is fixed to the objective lens 1 with an adhesive 2, and further the adhesive 2 is provided by potting so as to be higher than the height of the lens surface of the objective lens 1, i.e., so that the height thereof is equal to or less than WD and equal to or less than 0.3 mm. Moreover, a plurality of adhering portions on mutually opposite sides of the center of the objective lens 1 provide stability even when the adhesive collides with the optical disc.

The adhesive 2 is preferably provided with a gap that allows the adhesive to enter therein so as to be able to fix the objective lens 1 to the objective lens holder 4. Moreover, the adhesive 2 may be also formed with a protruding portion that is made when the objective lens 1 is mounted after applying the adhesive to the objective lens holder 4.

The shape of the objective lens 1 varies depending on the material to be used, and in an objective lens made of plastic, the end of the objective lens may be higher than the height of the lens surface as illustrated in FIG. 4. The reason why the objective lens 1 has such a shape is to reduce the possibility of the lens surface to suffer a damage due to the softness of the quality of the material. In that case, the adhesive needs to be provided by potting so as to be higher than the objective lens end and also higher than the height of the surface of the lens holder 4, as illustrated in FIG. 4. The height of the objective lens end and the height of the objective lens holder 4 are preferably the same or otherwise the height of the end of the objective lens is preferable lower than the objective lens holder 4. Moreover, the adhesive 2 does not need to enter between the objective lens 1 and the objective lens holder 4 as illustrated in FIG. 4, but even a bridge-like adhesion between the objective lens end and the objective lens holder does not pose a problem in performance.

As the nano filler-doped adhesive 2 used in this case, an adhesive having a low modulus of elasticity, to which approximately 10 wt % of the nano filler is added, is preferable as described above. This adhesive is the best adhesive in the use of the disc protector because addition of a small quantity of the nano filler increases the viscosity or improves the thixotropy and the potting shape does not change with time. Moreover, even if this adhesive comes in contact with the optical disc 11, the performance will not change because the size of the nano filler is in the range from 100 nm to 500 nm along one side.

Second Embodiment

Figure 5:
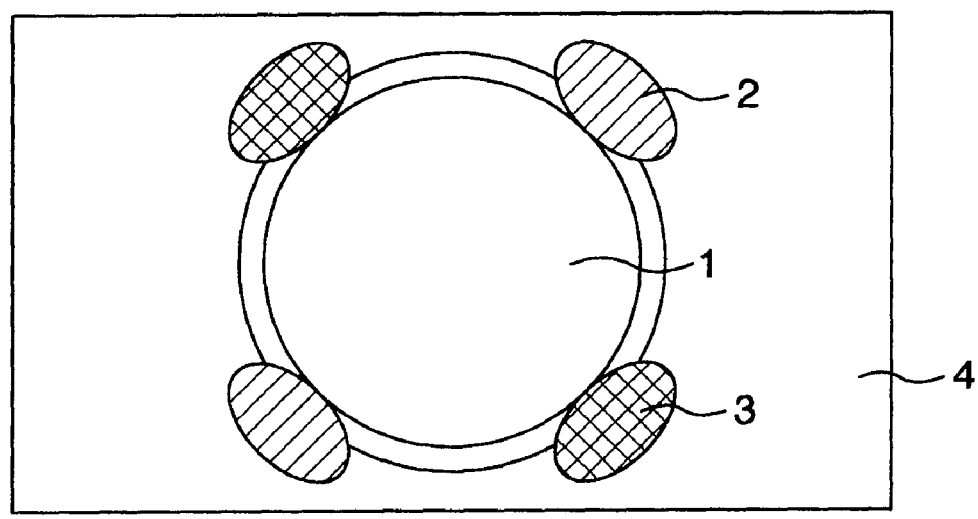
FIG. 5 is a top view illustrating a second embodiment in the optical pickup device according to the present invention.
Figure 6:
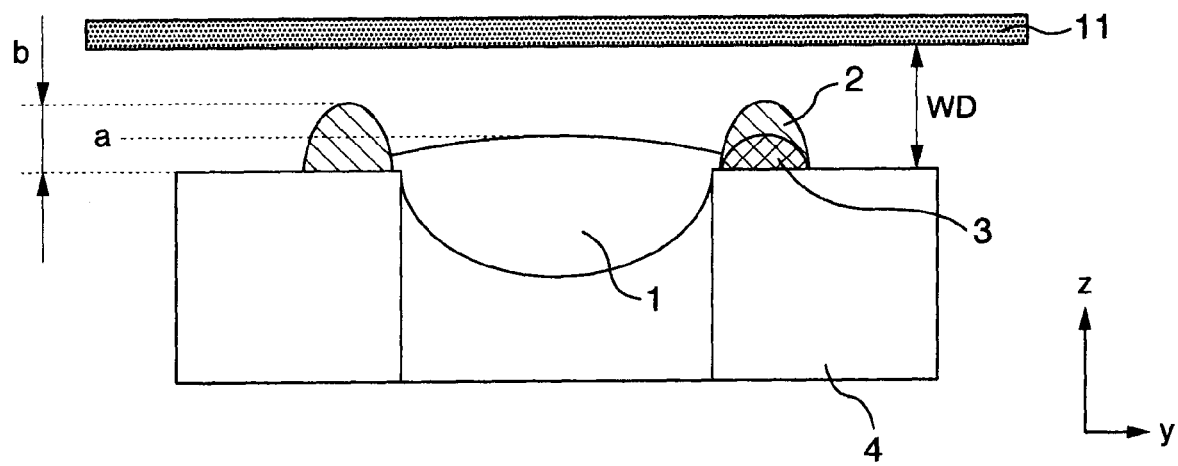
FIG. 6 is a cross sectional view illustrating the second embodiment in the optical pickup device according to the present invention.

FIG. 5 is a top view of an actuator portion of a second embodiment according to the present invention, and FIG. 6 is the side view. The objective lens 1 is in contact with the adhesives 2 and 3 at four portions, and the adhesives 2 and 3 are symmetrically applied with respect to the center of the lens, respectively. As illustrated in FIG. 6, a height of the adhesive 2 (b) is set higher than that of the objective lens 1(a) and the adhesive 3 is set as high as the objective lens, and the other points are the same as the first embodiment. In this manner, the adhesive 2 serves mainly as the disc protector while the adhesive 3 serves for adhering and fixing the objective lens 1 to the objective lens holder 4, thereby providing a more reliable bonded structure. This is because the adhesive strength with respect to the objective lens is guaranteed by means of the adhesive 3 although the adhesive 2 is likely to peel off by colliding with the lens because it serves as the disc protector.

Although as the adhesive 2, an adhesive containing a 10 wt % or less of nano filler and having a modulus of elasticity equal to or less than 1 GPa needs to be used, the adhesive 3 is capable of securing the adhesive strength with respect to plastic or glass and thus an ordinary adhesive may be also used. Moreover, in this case, for the adhesive 2 and the adhesive 3, an equivalent one is preferably used in terms of cost.

Third Embodiment

Figure 7:
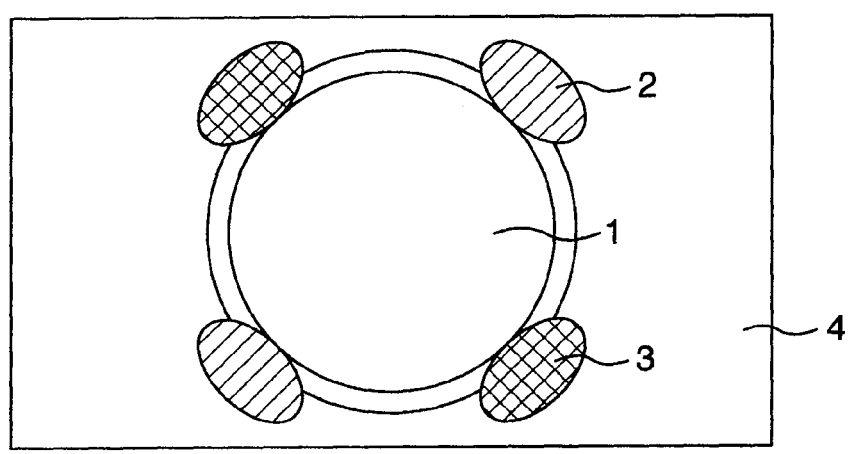
FIG. 7 is a top view illustrating a third embodiment in the optical pickup device according to the present invention.
Figure 8:
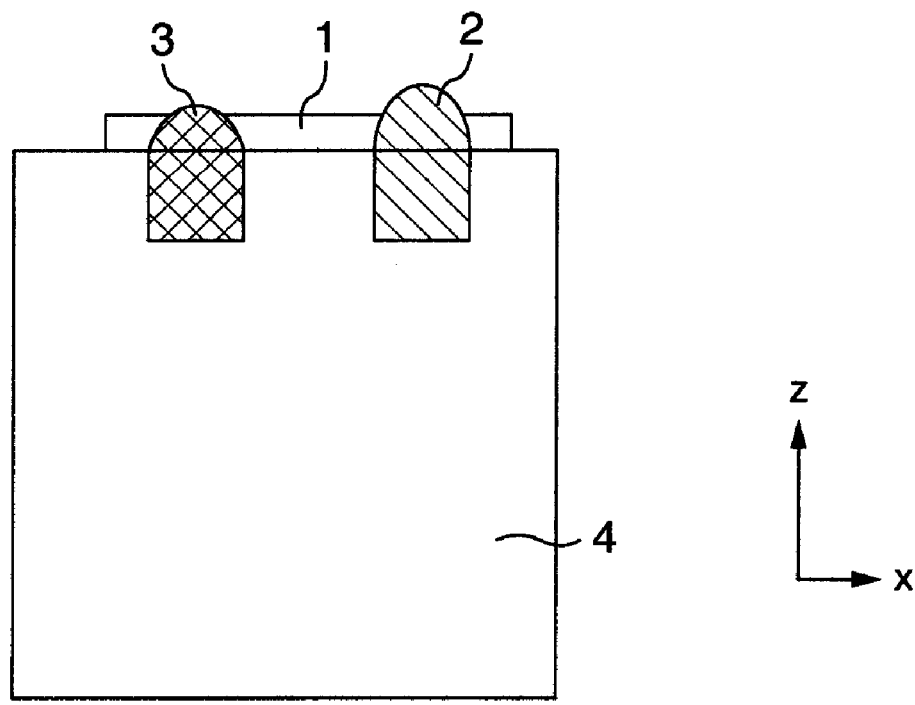
FIG. 8 is a cross sectional view illustrating the third embodiment in the optical pickup device according to the present invention.

FIG. 7 is a top view of an actuator portion of a third embodiment according to the present invention, and FIG. 8 is its side view. As illustrated in FIG. 8, a groove capable of holding the adhesive 2 or the adhesive 3 is formed on the objective lens holder 4 side. The other points are the same as the second embodiment. This groove is in contact with the objective lens 1, and by injecting the adhesive 2 or the adhesive 3 therein, the objective lens 1 can be adhered and fixed to the objective lens holder 4. Provision of such a groove in the objective lens holder 4 or in the objective lens 1 increases the adhesive strength. Moreover, the height adjustment of the adhesive 2 which is important in formation of the disc protector is facilitated.

Fourth Embodiment

Figure 9:
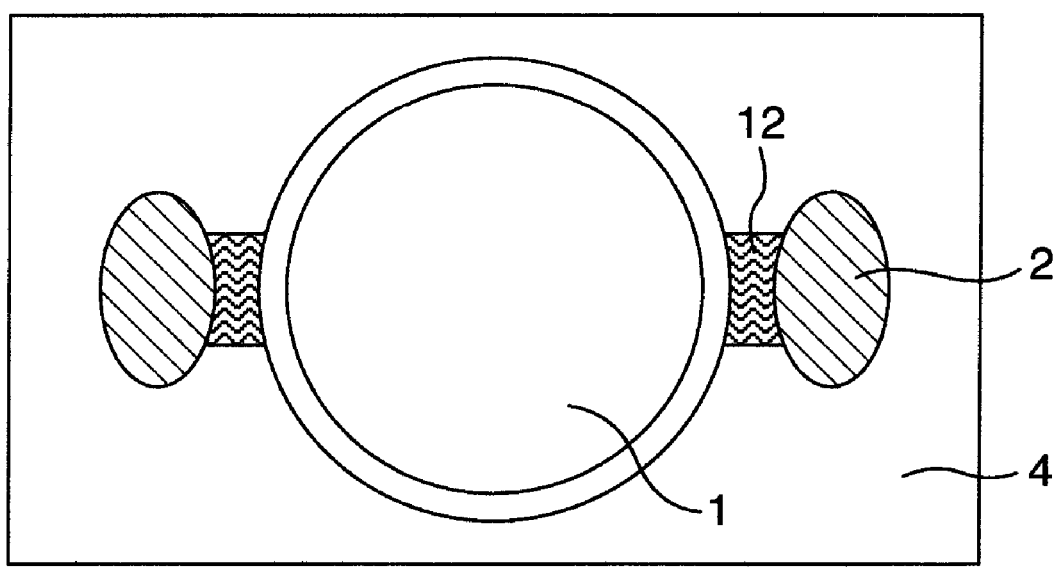
FIG. 9 is a top view illustrating a fourth embodiment in the optical pickup device according to the present invention.
Figure 10:
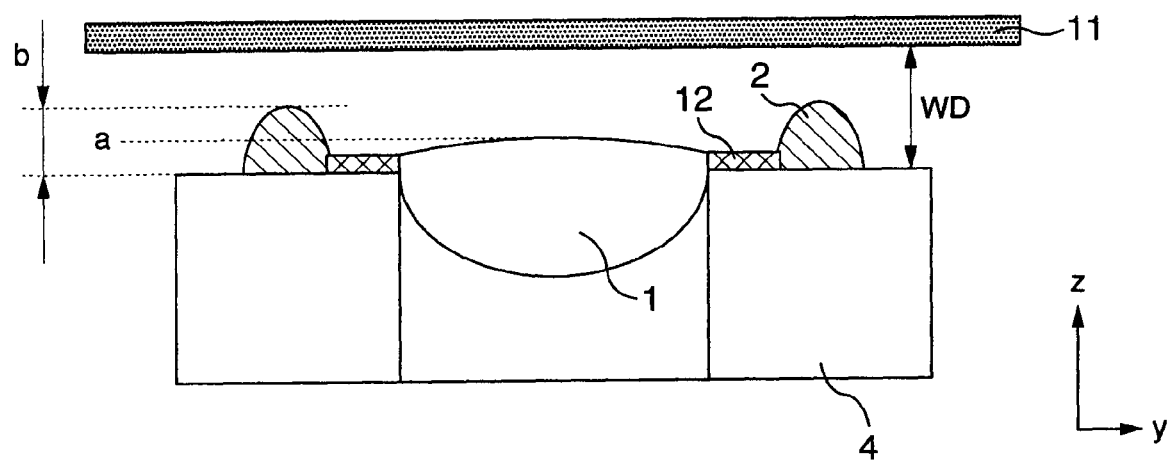
FIG. 10 is a cross sectional view illustrating the fourth embodiment in the optical pickup device according to the present invention.

FIG. 9 is a top view of an actuator portion of a fourth embodiment according to the present invention, and FIG. 10 is its side view. A protruding portion 12 protruding in the surface direction of the lens holder 4 (the direction intersecting with the optical axis or the direction of the optical disc surface) is attached to the objective lens 1, and an adhesive is applied to the protruding portion 12. The protruding portion 12 is preferably provided in pairs symmetrically with respect to the objective lens 1. The other points are the same as the first Embodiment 1. Whereby, the place of coating of the adhesive 2 is easily secured. Moreover, an increase in the bonding area increases the adhesive strength. When the objective lens of such a shape is used, the adhesive strength can be improved by increasing the number of protruding portions 12. Moreover, the adhering of the objective lens 1 and the forming of the disc protector can be implemented more easily.

Fifth Embodiment

Figure 14A:
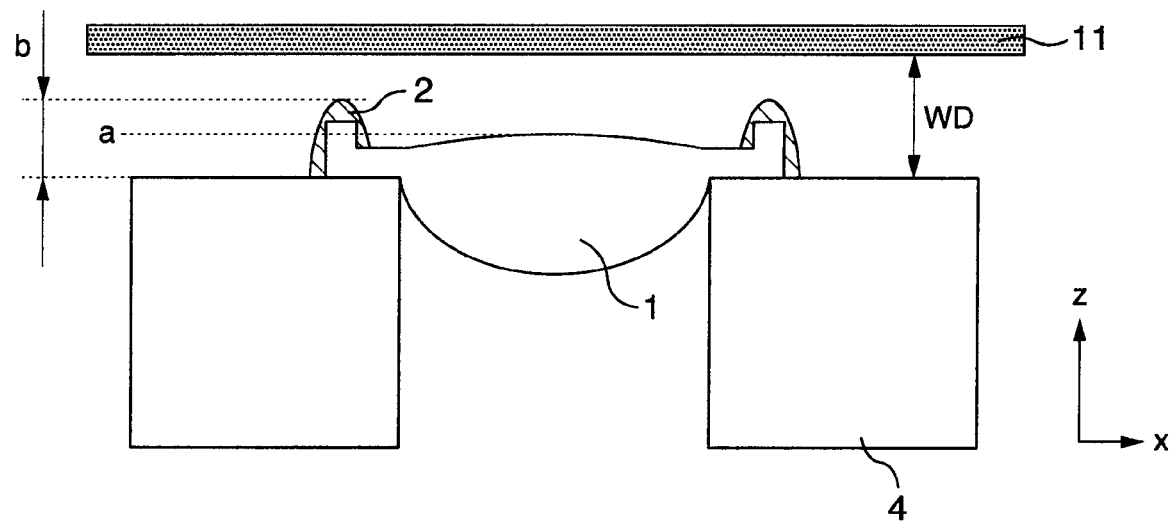
FIG. 14A is a cross sectional view illustrating a fifth embodiment in the optical pickup device according to the present invention.
Figure 14B:
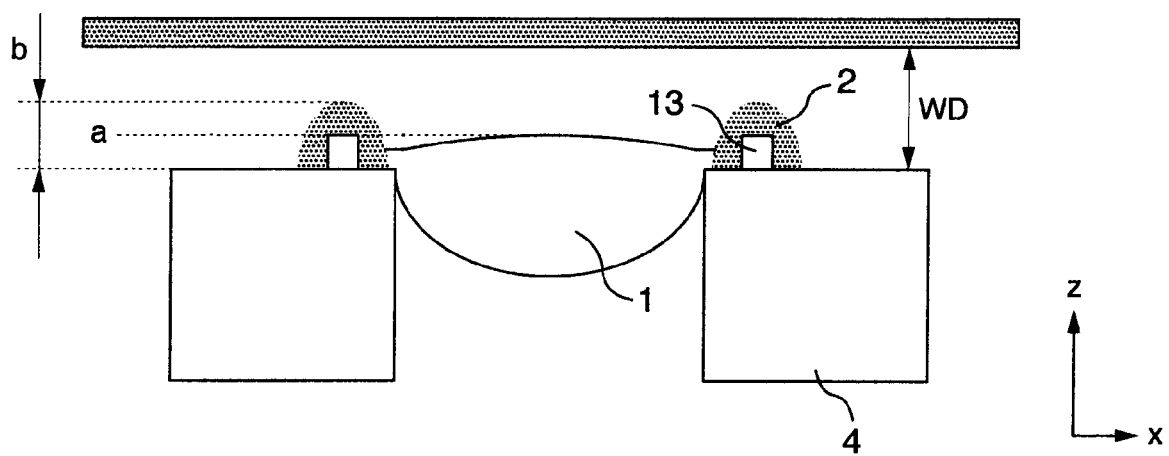
FIG. 14B is a cross sectional view illustrating the fifth embodiment in the optical pickup device according to the present invention.

FIG. 1 is a top view of an actuator portion of a fifth embodiment according to the present invention (the same as the first embodiment), and FIGS. 14A and 14B are their side views. In this embodiment, beneath the protector of the adhesive 2, protruding portions 13 formed integrally with the objective lens 1 or lens holder 4 is provided and the top thereof is covered with the adhesive 2. The other points are the same as the first embodiment. The protruding portions 13 protrude in the direction of the optical disc (the optical axis direction).

In this embodiment, provision of the adhesive 2 on top of the protruding portions 13 allows to form a tall disc protector, even the adhesive does not have high viscosity. The adhesive 2 on this projection integrates the objective lens 1 with the lens holder 4. The protruding portion 13 may be formed integrally with the objective lens 1 as with FIG. 14A or may be formed integrally with the lens holder 4 as illustrated in FIG. 14B.

Although, in the foregoing, the embodiments related to the optical pickup device according to the present invention have been described, the present invention is not limited to the above-described embodiments, and various modifications and the like are possible within the description of the present invention.

In recent years, with a reduction in size or a reduction in the thickness of the optical pickup, high speed recording to the optical recording medium, such as the DVD disc or the Blu-Ray disc of various kinds of standards, is desirable. In particular when attempting to satisfy these standards using one optical pickup device as much as possible, the design margin may decrease and the WD between the objective lens and the optical disc may decrease. For this reason, if the present embodiment is employed, as compared with the conventional case where a special molded component is fixed, a function equivalent or superior to a disc protector which is formed by fixing a special molding component can be held by just applying an adhesive. Moreover, since the objective lens can be also adhered and fixed at the same time, the workability can be improved and an increase in reliability and in the quality of the product can be achieved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup device recording information to an optical disc or reading information recorded in the optical disc, the optical pickup device comprising:
a light source for emitting a laser beam;
an objective lens configured for collecting the laser beam onto the optical disc;
a lens fixing portion fixing the objective lens; and
a light receiving element configured for receiving through the objective lens a laser beam reflected at an information recording layer in the optical disc,
wherein the objective lens is fixed to the lens fixing portion using an adhesive,
wherein a height of the adhesive relative to the lens fixing portion is higher than a height of a surface of the objective lens or an upper end of the objective lens, and
wherein the adhesive contains a clay in which a size of a sheet is in a range from 100 nm to 500 nm along one side and a thickness of the sheet is equal to or less than 2 nm.

2. An optical pickup device recording information to an optical disc or reading information in the optical disc, the optical pickup device comprising:
a light source for emitting a laser beam;
an objective lens configured for collecting the laser beam onto the optical device;
a lens fixing portion fixing the objective lens; and
a light receiving element configured for receiving through the objective lens a laser beam reflected at an information recording layer in the optical disc,
wherein the objectives lens is fixed to the lens fixing portion using an adhesive,
wherein a height of the adhesive relative to the lens fixing portion is higher than a height of a surface of the objective lens or an upper end of the objective lens, and
wherein the adhesive is a clay-additive adhesive, and wherein a surface of a clay to add is covered with an organic molecule containing Si, a carbon number of the organic molecule being in a range from 3 to 18.

3. The optical pickup device recording information to an optical disc or reading information recorded in the optical disc, the optical pickup device comprising:
a light source for emitting a laser beam;
an objective lens configured for collecting the laser beam onto the optical disc;
a lens fixing portion fixing the objective lens; and
a light receiving element configured for receiving through the objective lens a laser beam reflected at an information recording layer in the optical disc,
wherein the objective lens is fixed to the lens fixing portion using an adhesive,
wherein a height of the adhesive relative to the lens fixing portion is higher than a height of a surface of the objective lens or an upper end of the objective lens, and
wherein the adhesive is a clay-additive adhesive comprising a 2 wt % to 10 wt % of clay covered with an organic molecule and a 90 wt % to 98 wt % of adhesive.

* * * * *